(12) United States Patent
Feng et al.

(10) Patent No.: US 11,658,294 B2
(45) Date of Patent: May 23, 2023

(54) SECONDARY BATTERY AND BATTERY MODULE, BATTERY PACK AND APPARATUS COMPRISING THE SECONDARY BATTERY

(71) Applicant: Contemporary Amperex Technology Co., Limited, Ningde (CN)

(72) Inventors: Xin Feng, Ningde (CN); Jinyang Song, Ningde (CN); Xin Sun, Ningde (CN); Huisen Su, Ningde (CN); Chuanmiao Yan, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/547,284

(22) Filed: Dec. 10, 2021

(65) Prior Publication Data

US 2022/0102714 A1    Mar. 31, 2022

Related U.S. Application Data

(63) Continuation of application No. PCT/CN2020/114266, filed on Sep. 9, 2020.

(30) Foreign Application Priority Data

Sep. 27, 2019   (CN) .......................... 201910933499.4

(51) Int. Cl.
*H01M 4/38* (2006.01)
*H01M 4/583* (2010.01)
(Continued)

(52) U.S. Cl.
CPC ........... *H01M 4/386* (2013.01); *H01M 4/505* (2013.01); *H01M 4/525* (2013.01); *H01M 4/583* (2013.01);
(Continued)

(58) Field of Classification Search
CPC ...... H01M 4/386; H01M 4/505; H01M 4/525; H01M 4/583; H01M 50/209; H01M 10/0525; H01M 10/0585; H01M 2220/20
See application file for complete search history.

(56) References Cited

U.S. PATENT DOCUMENTS

2016/0020494 A1    1/2016  Hitachi
2018/0248220 A1    8/2018  Manabe et al.
(Continued)

FOREIGN PATENT DOCUMENTS

CN    102024917 A    4/2011
CN    104681853 A    6/2015
(Continued)

OTHER PUBLICATIONS

The International search report for PCT Application No. PCT/CN2020/114266, dated Dec. 15, 2020, 16 pages.
(Continued)

*Primary Examiner* — Osei K Amponsah
(74) *Attorney, Agent, or Firm* — East IP P.C.

(57) ABSTRACT

The present application refers to secondary battery and battery module, battery pack and apparatus including the secondary battery. In particular, the secondary battery includes a housing as well as an electrode assembly and an electrolyte contained in the housing; the electrode assembly includes a positive electrode plate, a negative electrode plate and a separator, and the positive electrode plate includes a positive current collector and a positive electrode film that is disposed on at least one surface of the positive electrode current collector and includes a positive electrode active material; the positive electrode active material includes one or more of lithium nickel cobalt manganese oxide and lithium nickel cobalt aluminum oxide; the negative electrode plate includes a negative electrode current collector and a negative electrode film that is disposed on at least one (Continued)

surface of the negative electrode current collector and includes a negative electrode active material.

18 Claims, 3 Drawing Sheets

(51) Int. Cl.
    *H01M 4/505*      (2010.01)
    *H01M 4/525*      (2010.01)
    *H01M 10/0585*    (2010.01)
    *H01M 10/0525*    (2010.01)
    *H01M 50/209*     (2021.01)

(52) U.S. Cl.
    CPC .............. *H01M 10/0525* (2013.01); *H01M 10/0585* (2013.01); *H01M 50/209* (2021.01); *H01M 2220/20* (2013.01)

(56) References Cited

U.S. PATENT DOCUMENTS

| | | | |
|---|---|---|---|
| 2018/0342727 | A1 | 11/2018 | Song et al. |
| 2020/0144560 | A1* | 5/2020 | Oka ............... H01M 10/0468 |

FOREIGN PATENT DOCUMENTS

| | | |
|---|---|---|
| CN | 105322232 A | 2/2016 |
| CN | 107851778 A | 3/2018 |
| CN | 108807974 A | 11/2018 |
| CN | 109509909 A | 3/2019 |
| CN | 110109029 A | 8/2019 |
| EP | 3588629 A1 | 1/2020 |
| JP | 2009283276 A | 12/2009 |
| JP | 201165998 A | 3/2011 |
| JP | 2015130329 A | 7/2015 |
| JP | 2015187929 A | 10/2015 |
| JP | 2015220119 A | 12/2015 |
| KR | 10-2013-0117691 A | 10/2013 |
| KR | 20190042850 | 4/2019 |
| KR | 10-2019-0066867 A | 6/2019 |
| WO | 2015177617 A1 | 11/2015 |
| WO | 2018179897 A1 | 10/2018 |

OTHER PUBLICATIONS

The Notification Grant Action for China Application No. 201910933499.4, dated Sep. 15, 2021, 7 pages.
The First Office Action for Indian Application No. 202217006105, dated May 31, 2022, 5 pages.
The Official Action and search report dated Aug. 23, 2022 for Japanese application No. 2022-508962, 5 pages.
The Extended European Search Report for EP Application No. 20869720.1, dated Dec. 8, 2022, 9 pages.
The Notice of Allowance for Korean Application No. 10-2022-7006306, dated Feb. 7, 2023, 5 pages.

* cited by examiner

SECONDARY BATTERY AND BATTERY MODULE, BATTERY PACK AND APPARATUS COMPRISING THE SECONDARY BATTERY

CROSS-REFERENCE TO RELATED APPLICATION

This application is a continuation of International Application No. PCT/CN2020/114266, filed on Sep. 9, 2020, which claims priority to Chinese Patent Application No. 201910933499.4, titled "SECONDARY BATTERY AND BATTERY MODULE, BATTERY PACK AND APPARATUS COMPRISING THE SECONDARY BATTERY" and filed on Sep. 27, 2019, both of which are incorporated herein by reference in their entireties.

TECHNICAL FIELD

This application belongs to the field of electrochemical technology. More specifically, this application relates to a secondary battery as well as battery module, battery pack and apparatus comprising the secondary battery.

BACKGROUND

New energy vehicles represent the development direction of the world's automobile industry. As a new type of high-voltage, high-energy-density rechargeable batteries, secondary batteries have outstanding characteristics such as light weight, high energy density, no pollution, and long service life, so they are widely used in new energy vehicles As consumers' requirements for cruising range have being increasing, the development of high-capacity lithium-ion batteries has become the focus of attention in the industry.

In order to increase the energy density of lithium-ion batteries, positive electrode active materials and negative electrode active materials with higher energy density are required. For negative electrode active materials, traditional graphite negative electrode material is increasingly unable to meet the requirements of technological development. Silicon-based materials have once become a hotspot of research due to their gram-capacity of more than ten times higher than that of graphite and a lower lithium-intercalation potential. However, silicon material has a huge volume expansion (300%) during the process of lithium intercalation. The huge volume effect causes pulverization and shedding during charging and discharging, leading to deterioration of electrochemical performance of the battery, which hinders the commercial application of silicon-based negative electrode materials.

Therefore, there is a need for further improving the electrochemical performance and kinetic performance of the secondary battery with silicon-containing negative electrode material meanwhile ensuring the capacity and the energy density of electrode assembly.

SUMMARY

A first aspect of the present application provides a secondary battery, including a housing as well as an electrode assembly and an electrolyte contained in the housing. The electrode assembly includes a positive electrode plate, a negative electrode plate and a separator. The positive electrode plate includes a positive current collector and a positive electrode film that is disposed on at least one surface of the positive electrode current collector and includes a positive electrode active material. The negative electrode plate includes a negative electrode current collector and a negative electrode film that is disposed on at least one surface of the negative electrode current collector and includes a negative electrode active material. The positive electrode active material includes one or more of lithium nickel cobalt manganese oxide and lithium nickel cobalt aluminum oxide. The negative electrode active material includes silicon-based material and carbon material; and the secondary battery satisfies: $0.05 \leq Z \leq 0.6$, wherein, $$Z=\{Vt-V0-(Hb-Ha)*S-V1\}/CAP;$$

Vt represents a volume of internal space of the housing, in $cm^3$;
V0 represents a volume of the electrode assembly when the battery is at 0% SOC, in $cm^3$;
Ha represents a thickness of the negative electrode film when the battery is at 0% SOC, in cm;
Hb represents a thickness of the negative electrode film when the battery is at 100% SOC, in cm;
S represents total area of the negative electrode film in the battery, in $cm^2$;
V1 represents the volume of the electrolyte in the battery after formation, in $cm^3$; and
CAP represents a rated capacity of the battery, in Ah.

In this application, by reasonably designing the electrode plate, the volume of the housing, and the content of electrolyte and other parameters during the designing process of battery so that the battery satisfies the specific relationship of formula, the secondary battery can have high energy density, long cycle life and good kinetic performance at the same time.

In any of the foregoing embodiments, the secondary battery may satisfy $0.1 \leq Z \leq 0.5$; optionally, the secondary battery may satisfy $0.15 \leq Z \leq 0.4$. When Z is within the given ranges, the cycle life and kinetic performance of the battery may be further improved.

In any of the foregoing embodiments, the secondary battery may further satisfy: $1 < Hb/Ha \leq 1.5$; optionally, $1 < Hb/Ha \leq 1.3$.

In any of the foregoing embodiments, the secondary battery may further satisfy $1.5 \text{ g/Ah} \leq Mel/CAP \leq 2.4 \text{ g/Ah}$, optionally $1.7 \text{ g/Ah} \leq Mel/CAP \leq 2.2 \text{ g/Ah}$, where Mel represents: the mass of the electrolyte in the battery after formation, in g. When the battery satisfies this condition, its cycle performance and interface stability may be both further improved.

In any of the above embodiments, the density Del of the electrolyte may be $1.0 \text{ g/cm}^3 \leq Del \leq 1.3 \text{ g/cm}^3$, optionally, $1.1 \text{ g/cm}^3 \leq Del \leq 1.25 \text{ g/cm}^3$.

In any of the above embodiments, the coating weight CW of the negative electrode film may be $5 \text{ mg/cm}^2 \leq CW \leq 15 \text{ mg/cm}^2$; optionally, $6 \text{ mg/cm}^2 \leq CW \leq 13 \text{ mg/cm}^2$.

In any of the above embodiments, the compaction density PD of the negative electrode film may be $1.4 \text{ g/cm}^3 \leq PD \leq 1.8 \text{ g/cm}^3$, optionally, $1.5 \text{ g/cm}^3 \leq PD \leq 1.7 \text{ g/cm}^3$.

In any of the foregoing embodiments, the silicon-based material may include one or more of silicon element, silicon alloy, silicon-oxygen compound, silicon-carbon compound, and silicon-nitrogen compound; optionally, the silicon-based material may include silicon-oxygen compound.

In any of the foregoing embodiments, the mass percentage W of the silicon-based material in the negative electrode active material may satisfy: $W \leq 40\%$; optionally, $10\% \leq W \leq 30\%$. When the content of silicon-based material is within the above range, the battery may not only benefit from high energy density of silicon-based material, but also have a further reduced adverse effect of expansion of silicon-based material.

In any of the foregoing embodiments, the carbon material may include one or more of graphite, soft carbon, and hard carbon; optionally, the carbon material may include graphite, and the graphite is selected from one or more of artificial graphite and natural graphite.

In any of the foregoing embodiments, wall thickness T of the housing may satisfy 0.2 mm≤T≤1 mm; optionally, 0.4 mm≤T≤0.7 mm.

In any of the foregoing embodiments, the secondary battery may further include a top cover in which a turnover unit is arranged, and the turnover unit has a compressive strength of ≥0.35 MPa. This design can further improve the safety of battery.

In any of the above embodiments, the positive electrode active material may include one or more of a material having a general formula $Li_aNi_bCo_cM_dM'_eO_fA_g$ or a material $Li_aNi_bCo_cM_dM'_eO_fA_g$ coated with a coating layer on at least a part of its surface, wherein 0.8≤a≤1.2, 0.5≤b<1, 0<c<1, 0<d<1, 0≤e≤0.1, 1≤f≤2, 0≤g≤1, M is selected from one or more of Mn and Al, M' is selected from one or more of Zr, Al, Zn, Cu, Cr, Mg, Fe, V, Ti, and B, and A is selected from one or more of N, F, S, and Cl. This type of positive electrode active material has a relatively high energy density.

In any of the above embodiments, at least a part of the positive electrode active material may be in form of single crystal particles.

In any of the foregoing embodiments, the positive electrode active material may further include one or more of lithium nickel oxide, lithium manganese oxide, lithium iron phosphate, lithium manganese phosphate, lithium iron manganese phosphate, lithium cobalt oxide and their modified compounds.

A second aspect of the present application provides a battery module including the secondary battery of the first aspect of the present application.

A third aspect of the present application provides a battery pack, including the battery module of the second aspect of the present application.

A fourth aspect of the present application provides an apparatus, including at least one of the secondary battery of the first aspect of the present application, the battery module of the second aspect of the present application, or the battery pack of the third aspect of the present application.

The battery module, battery pack, and apparatus of the present application include the secondary battery of the present application, and thus have the same or similar effects as the secondary battery.

BRIEF DESCRIPTION OF THE DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on the drawings without creative work.

Figure 1:
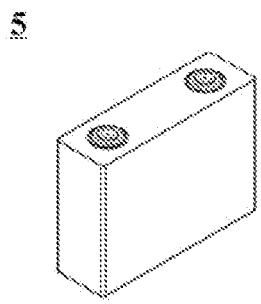
FIG. 1 is a schematic diagram of an embodiment of a secondary battery provided by the present application.

In the drawings, the figures are not drawn to actual scale. In above figures, the reference signs are defined as follows: 1—battery pack; 2—upper case body; 3—lower case body; 4—battery module; 5—secondary battery; 51—housing; 52—electrode assembly; and 53—cover plate.

DETAILED DESCRIPTION

In order to make the object, technical solution, and technical effects of the present application apparent, the following describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limit to form an unspecified range; and any upper limit may be combined with any other upper limit to form an unspecified range. Further, although not explicitly specified, each point or single value between the endpoints of a range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. The recitation of "more" in the phrase "one or more" includes two and more.

In the description herein, unless otherwise stated, the term "or" is inclusive. For example, the phrase "A or B" means "A, B, or both A and B." More specifically, any of the following conditions satisfy the condition "A or B": A is true (or exists) and B is false (or does not exist); A is false (or does not exist) and B is true (or exists); or both A and B are true (or exist).

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

The secondary battery according to the first aspect of the present application will be described in detail below.

The secondary battery of the present application comprises a housing as well as an electrode assembly and an electrolyte contained in the housing. The electrode assembly comprises a positive electrode plate, a negative electrode plate and a separator, and the positive electrode plate comprises a positive current collector and a positive electrode film that is disposed on at least one surface of the positive electrode current collector and comprises a positive electrode active material, and the negative electrode plate comprises a negative electrode current collector and a negative electrode film that is disposed on at least one surface of the negative electrode current collector and comprises a negative electrode active material. The positive electrode active material comprises one or more of lithium nickel cobalt manganese oxide and lithium nickel cobalt aluminum oxide. The negative electrode active material comprises silicon-based material and carbon material. The secondary battery satisfies: $0.05 \leq Z \leq 0.6$.

In this application, Z value is defined as $Z=\{Vt-V0-(Hb-Ha)*S-V1\}/CAP$. In the formula, Vt represents a volume of internal space of the housing, in $cm^3$; V0 represents a volume of the electrode assembly when the battery is at 0% SOC, in $cm^3$; Ha represents a thickness of the negative electrode film when the battery is at 0% SOC, in cm; Hb represents a thickness of the negative electrode film when the battery is at 100% SOC, in cm; S represents total area of the negative electrode film, in $cm^2$; V1 represents the volume of electrolyte in the battery after formation, in $cm^3$; and CAP represents a rated capacity of the battery, in Ah.

It should be noted that the state of a battery at 0% SOC is sometimes also referred to as the "fully discharged state of a battery"; the state of a battery at 100% SOC is sometimes also referred to as the "fully charged state of a battery".

The rated capacity CAP of a battery refers to the capacity released during the process that a fully charged battery discharges at a current of 1 $I_1$ (A) at room temperature and reaches the final voltage, wherein $I_1$ represents the discharge current at 1C rate. For details, please refer to the national standard GB/T31484-2015: cycle life requirements and test methods for traction battery of electric vehicle.

The inventors found that when a silicon-based material is used as a negative electrode material in the negative electrode film of a secondary battery, the safety performance, cycle life, and kinetic performance of the battery will be greatly affected. During research and development of batteries, the inventors unexpectedly found that when the volume of housing, electrode plate and the relevant parameters of electrolyte in battery assembly process are adjusted to satisfy a specific relationship, the problems in view of for example gas production, cycle performance, and interface stability in a battery comprising silicon-containing negative electrode material during use are effectively improved, so that the battery can have long cycle life and good kinetic performance and safety performance at the same time while having a relatively high energy density.

It has been found that when $Z<0.05$, during the charging process of the battery with silicon-containing negative electrode active material, the silicon negative electrode film bounces more severely and substantially occupies the entire space inside the housing, so that the bare electrode assembly may press up against the housing, resulting in contact between positive and negative electrode plates and thus short circuit, and even safety problems. In addition, with a fully occupied internal space of the housing, short-term cycling or storage is likely to cause a failure of the battery's turnover unit and an invalid electrode assembly.

It has been found that when $Z>0.6$, the gas generated during use of the battery may remain between electrode plates, resulting in poor interface of electrode plate and affecting the kinetic performance of the battery, which may lead to a large amount of black spots in the negative electrode film and lithium precipitation. In the slightest cases, it will affect the service life of the battery, and in the worst cases, some safety risks may be caused.

In some embodiments of the present application, the lower limit of Z value may be any one of 0.05, 0.1, 0.12, 0.14, 0.16, 0.18, 0.2, 0.22, 0.23, 0.25, 0.27, 0.28, 0.3, 0.35, 0.38, and 0.4; and the upper limit of Z value may be any one of 0.4, 0.42, 0.45, 0.48, 0.5, 0.55, and 0.6.

In some embodiments of the present application, optionally, the battery satisfies: $0.1 \leq Z \leq 0.5$; for example, the battery satisfies: $0.15 \leq Z \leq 0.4$, $0.146 \leq Z \leq 0.435$, or $0.217 \leq Z \leq 0.346$.

In some embodiments of the present application, optionally, the secondary battery may further satisfy: $1<Hb/Ha \leq 1.5$; for example, $1<Hb/Ha \leq 1.3$.

In the present application, the secondary battery further includes a top cover for sealing the housing, and a turnover unit is provided on the top cover. When an internal air pressure of the secondary battery increases to a certain pressure, the turnover unit deforms. The smaller value of internal pressure of the battery represents better performance at high temperature (for example, 45° C.), and lower possibility of failure due to gas production at high temperature. When the internal pressure is more than a certain value range, the battery's life at high temperature will be shorter.

In some embodiments of the present application, optionally, the turnover unit has a compressive strength of $\geq 0.35$ MPa.

In some embodiments of the present application, the secondary battery may further satisfy $1.5$ g/Ah$\leq$Mel/CAP$\leq 2.4$ g/Ah, wherein Mel represents the mass of the electrolyte in the battery after formation, in g. When the battery satisfies this condition, its cycle performance and interface stability may be both further improved.

In some embodiments of the present application, the lower limit of Mel/CAP value may be any one of 1.5, 1.55, 1.6, 1.65, 1.7, 1.8, and 1.9; and the upper limit of Mel/CAP value may be any one of 1.7, 1.8, 2.0, 2.1, 2.2, 2.3, and 2.4.

In some embodiments of the present application, optionally, the secondary battery satisfies: 1.7 g/Ah$\leq$Mel/CAP$\leq 2.2$ g/Ah, 1.6 g/Ah$\leq$Mel/CAP$\leq 2.02$ g/Ah, 1.75 g/Ah$\leq$Mel/CAP$\leq 2.15$ g/Ah, or 1.8 g/Ah$\leq$Mel/CAP$\leq 2.1$ g/Ah.

In some embodiments of the present application, optionally, the density Del of the electrolyte may be 1.0 g/$cm^3 \leq$Del$\leq 1.3$ g/$cm^3$; for example 1.1 g/$cm^3 \leq$Del$\leq 1.25$ g/$cm^3$.

The secondary battery of the present application comprises a housing, an electrode assembly fixed in the housing, and an electrolyte injected into the housing. The electrode assembly comprises a positive electrode plate, a negative electrode plate and a separator, and the electrode assembly is immersed in the electrolyte. The active ions move between the positive and negative electrodes via the electrolyte as the medium, to realize the charge and discharge of the battery. In order to avoid a short circuit between the positive and negative electrodes, a separator is required to separate the positive and negative electrode plates.

The electrode assembly may be in a wound or laminated way. When the electrode assembly is in a wound way, one or more wound electrode assemblies may be included in the housing of the battery.

In some embodiments of the present application, optionally, the housing of the secondary battery is a hard housing, and the material of the housing may be selected from hard materials, such as aluminum housing, steel housing, and plastic housing.

Figure 2:
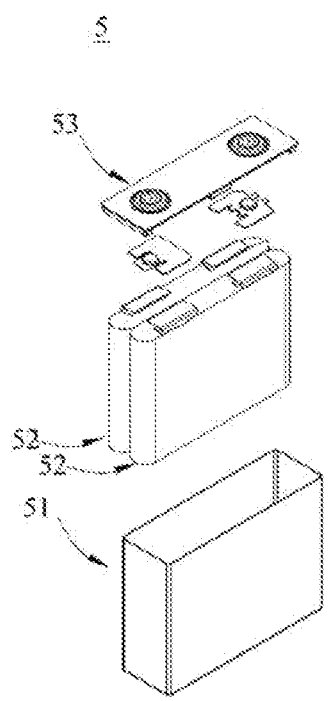
FIG. 2 is an exploded view of FIG. 1.

In some embodiments of the present application, optionally, the secondary battery may be a square battery or a cylindrical battery. FIG. 1 shows a secondary battery 5 with a square structure as an example. In some embodiments, referring to FIG. 2, the outer packaging may include a housing 51 and a cover plate 53. In an example, the housing 51 may include a bottom plate and a side plate connected to the bottom plate, and the bottom plate and the side plate are combined to form an accommodating cavity. The housing 51 has an opening communicating with the accommodating cavity, and the cover plate 53 is used for covering the opening to close the accommodating cavity. The positive electrode plate, the negative electrode plate, and the separator may be wounded or laminated to form an electrode assembly 52. The electrode assembly 52 is encapsulated in the accommodating cavity. The electrolyte is infiltrated in the electrode assembly 52. The number of electrode assemblies 52 included in the secondary battery 5 may be one or several, which can be adjusted according to requirements.

In some embodiments of the present application, optionally, wall thickness T of the housing may satisfy 0.2 mm≤T≤1 mm, for example 0.4 mm≤T≤0.7 mm.

The various parameters involved in this specification can be measured according to well-known methods in the art. For example, the tests can be performed according to the methods given in Examples of the present application.

A lithium-ion secondary battery is used hereafter as an example to describe the technical solution of the present application in detail.

First, the positive electrode plate may be prepared according to the conventional method in the art. Except that the positive electrode active material is required to include one or more of lithium nickel cobalt manganese oxide and lithium nickel cobalt aluminum oxide, there is no other limit on the positive electrode plate in the present application. Generally, in the above-mentioned positive electrode active material, it is necessary to add a conductive agent (for example, carbon material such as carbon black), a binder (for example, PVDF), and the like. If necessary, other positive electrode active materials or other additives (such as PTC thermistor materials, etc.) may also be added. These materials are usually mixed together and dispersed in a solvent (such as NMP), stirred evenly, and evenly applied on the positive electrode current collector. After drying step, a positive electrode plate is obtained. Materials such as porous metal plate or metal foil (for example aluminum foil) may be used as the positive electrode current collector. Preferably, aluminum foil is used.

Then, the negative electrode plate of a battery may be prepared. The negative electrode plate in the present application may be prepared according to the well-known method in the art. Generally, the negative electrode active material and an optional conductive agent (such as carbon materials, for example carbon black, and metal particles), a binder (such as SBR), and other optional additives (such as PTC thermistor material) are mixed together and dispersed in a solvent (such as deionized water), stirred evenly, and evenly applied on the negative electrode current collector. After drying step, a negative electrode plate containing a negative electrode film layer is obtained. Materials such as a porous metal plate or metal foil (for example a copper foil) may be used as the negative electrode current collector. Preferably, copper foil is used.

It is worth noting that during the preparation of positive and negative electrode plates, current collector may be coated on both sides or on either side. In the calculation of Z value, both Ha and Hb represent the single-sided thickness of the negative electrode film (no matter single-sided coating or double-sided coating), and S represents the total area of the negative electrode film (that is, S represents the area of single-sided coating in the case of single-sided coating, and represents the total area of both sides in the case of double-sided coating).

Finally, the positive electrode plate, the separator and the negative electrode plate are laminated in order, so that the separator is placed between the positive and negative electrode plates to provide isolation; after winding step, an electrode assembly is obtained; the electrode assembly is placed in the outer packaging housing which is then covered with a top cover, dried and injected with an electrolyte. After vacuum packaging, standing, forming, shaping and other processes, a battery is obtained.

The positive electrode plate in the battery of the present application comprises a positive electrode current collector and a positive electrode film that is disposed on at least one surface of the positive electrode current collector and comprises a positive electrode active material. The positive electrode active material comprises one or more of lithium nickel cobalt manganese oxide and lithium nickel cobalt aluminum oxide; optionally, the positive electrode active material comprises one or more of a material having a general formula $Li_aNi_bCo_cM_dM'_eO_fA_g$ or a material $Li_aNi_bCo_cM_dM'_eO_fA_g$ coated with a coating layer on at least a part of its surface, wherein $0.8 \leq a \leq 1.2$, $0.5 \leq b < 1$, $0 < c < 1$, $0 < d < 1$, $0 \leq e \leq 0.1$, $1 \leq f \leq 2$, $0 \leq g \leq 1$, M is selected from one or more of Mn and Al, M' is selected from one or more of Zr, Al, Zn, Cu, Cr, Mg, Fe, V, Ti, and B, and A is selected from one or more of N, F, S, and Cl.

In some embodiments of the present application, optionally, at least a part of the positive electrode active material is in form of single crystal particles.

The positive electrode film usually also comprises a conductive agent (for example, acetylene black, etc.), a binder (for example, PVDF, etc.), and other optional additives (for example, PTC thermistor material, etc.).

There is no specific limitation on the type of positive electrode current collector, and it can be selected according to actual needs. Specifically, the positive electrode current collector may be selected from metal foils, such as aluminum foil.

The negative electrode plate in the battery of the present application comprises a negative electrode current collector and a negative electrode film that is disposed on at least one surface of the negative electrode current collector and comprises a negative electrode active material. The negative electrode active material comprises silicon-based material and carbon material.

The silicon-based material may comprise one or more of silicon element, silicon alloy, silicon-oxygen compound, silicon-carbon composite, and silicon-nitrogen compound; alternatively, the silicon-based material may comprise silicon-oxygen compound.

In some embodiments of the present application, optionally, the mass percentage of the silicon-based material in the negative electrode active material is $0 \leq W \leq 40\%$; for example, $5\% \leq W \leq 40\%$, $10\% \leq W \leq 30\%$. When the content of silicon-based material is within the above ranges, the battery may not only benefit from high energy density of silicon-based material, but also have a further reduced adverse effect of expansion of silicon-based material.

The carbon material may comprise one or more of graphite, soft carbon, and hard carbon, and preferably includes graphite. The graphite material may be one or more selected from artificial graphite and natural graphite.

The negative electrode film usually further comprises a conductive agent and a binder.

In some embodiments of the present application, optionally, the conductive agent comprises carbon nanotubes (CNT) with the weight content of ≤10%, for example, from 2% to 8%, relative to the total weight of negative electrode film.

In some embodiments of the present application, optionally, the binder includes a polyacrylic compound, and the polyacrylic compound may be selected from one or more of polyacrylic acid and/or sodium polyacrylate, with the weight content of ≤10%, for example, from 2% to 8%, relative to the total weight of negative electrode film.

In some embodiments of the present application, optionally, the coating weight CW of the negative electrode film may be 5 mg/cm$^2$≤CW≤15 mg/cm$^2$; for example, 6 mg/cm$^2$≤CW≤13 mg/cm$^2$.

In some embodiments of the present application, optionally, the compaction density PD of the negative electrode film may be 1.4 g/cm$^3$≤PD≤1.8 g/cm$^3$, optionally, 1.5 g/cm$^3$≤PD≤1.7 g/cm$^3$.

There is no specific limitation on the type of negative electrode current collector, and it can be selected according to actual needs. Specifically, the negative electrode current collector may be selected from metal foils, such as copper foil.

In this application, the positive electrode film may be disposed on one surface of the positive electrode current collector, or may be disposed on both surfaces of the positive electrode current collector at the same time; the negative electrode film may be disposed on one surface of the negative electrode current collector may also be disposed on both surfaces of the negative electrode current collector at the same time. It should be noted that when the above-mentioned positive and negative electrode films are disposed on both surfaces of the positive and negative current collectors at the same time, respectively, the above-mentioned ranges of parameters for the positive and negative electrode films all refer to the ranges of parameters for the single-sided positive and negative electrode films (such as thickness, coating weight, compaction density). In addition, the thickness and coating weight of the positive and negative electrode films described in this application refer to the thickness and coating weight in the positive and negative electrode plates that have been cold-pressed and compacted and are used for assembling a battery.

In the secondary battery of the present application, the separator is located between the positive electrode plate and the negative electrode plate to provide an isolation. The type of the isolation film is not specifically limited, and may be any isolation film material used in existing batteries, such as polyethylene, polypropylene, polyvinylidene fluoride and their multilayer composite film, but not limited to these materials.

In the secondary battery of the present application, the type of the electrolyte is not specifically limited. The electrolyte may comprise electrolyte salts and organic solvents, and the types of electrolyte salts and organic solvents are not specifically limited and may be selected according to actual needs. For example, as a non-aqueous electrolyte, a solution of lithium salt dissolved in an organic solvent is generally used. For example, lithium salt is inorganic lithium salts, such as LiClO$_4$, LiPF$_6$, LiBF$_4$, LiAsF$_6$, LiSbF$_6$, or organic lithium salts, such as LiCF$_3$SO$_3$, LiCF$_3$CO$_2$, Li$_2$C$_2$F$_4$(SO$_3$)$_2$, LiN(CF$_3$SO$_2$)$_2$, LiC(CF$_3$SO$_2$)$_3$, and LiC$_n$F$_{2n+1}$SO$_3$ (n≥2). The organic solvents used in the non-aqueous electrolyte are, for example, cyclic carbonates such as ethylene carbonate, propylene carbonate, butylene carbonate, and vinylene carbonate; chain carbonates such as dimethyl carbonate, diethyl carbonate, methyl ethyl carbonate; chain esters such as methyl propionate; cyclic esters such as γ-butyrolactone; chain ethers such as dimethoxyethane, diethyl ether, diethylene glycol dimethyl ether, triethylene glycol dimethyl ether; cyclic ethers such as tetrahydrofuran and 2-methyl-tetrahydrofuran; nitriles such as acetonitrile and propionitrile; or mixtures of these solvents. The electrolyte may also comprise additives, and there is no specific limit on the type of additives. For example, the additives may be negative electrode film-forming additives, positive electrode film-forming additives, and additives that can improve certain performance of the battery, such as additives that improve overcharge performance of the battery, additives that improve high-temperature performance of the battery, and additives that improve low-temperature performance of the battery. Optionally, the additive comprises fluoroethylene carbonate solvent (FEC).

The secondary battery of the present application can be prepared by a well-known method, but before the battery is prepared, the parameters involved in the present application need to be considered at the same time. For example, during the formation process in the preparation of a battery, a part of the electrolyte will be consumed. In order to ensure that the total quality of the electrolyte inside the battery meets the design requirements after formation, the initial addition amount of electrolyte needs to be calculated on the basis of experience. The initial addition amount of electrolyte=the total mass of electrolyte in the battery after the formation+ the mass of electrolyte consumed during the formation. Optionally, in the secondary battery of the present application, the mass of electrolyte consumed during the formation may be considered at 0.1 g/Ah to 0.3 g/Ah.

Compared with traditional secondary batteries, the present application can allow the secondary battery to having a high energy density and effectively improved high-temperature cycle performance and kinetic performance at the same time. Therefore, it is of great significance to fields such as new energy vehicles.

A second aspect of the present application provides a battery module comprising any one or more of the secondary batteries of the first aspect of the present application. The number of secondary batteries in the battery module may be adjusted according to the application and capacity of the battery module.

Figure 3:
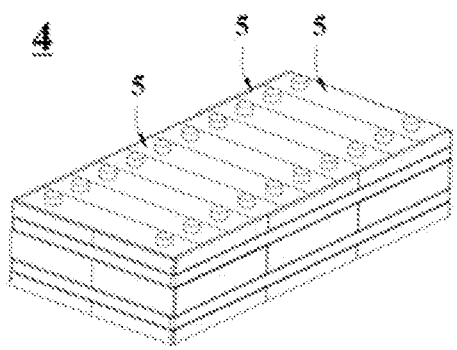
FIG. 3 is a schematic diagram of an embodiment of a battery module provided by the present application.

In some embodiments, referring to FIG. 3, in the battery module 4, a plurality of secondary batteries 5 may be disposed sequentially in the length direction of the battery module 4. Apparently, the secondary batteries 5 may also be disposed in any other manner. Furthermore, a plurality of secondary batteries 5 may be fixed by fasteners.

Optionally, the battery module 4 may further comprise a housing with a receiving space, and the plurality of secondary batteries 5 are received in the receiving space.

A third aspect of the present application provides a battery pack, including any one or more of the secondary batteries of the first aspect of the present application or the battery module of the second aspect of the present application.

By using the secondary battery of the present application, the battery pack of the present application exhibits relatively high energy density, cycle performance and storage performance.

The number of the battery modules in the battery pack may be adjusted according to the application and capacity of the battery pack.

Figure 4:
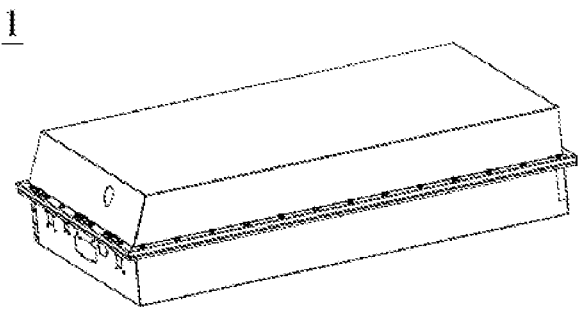
FIG. 4 is a schematic diagram of an embodiment of a battery pack provided by the present application.
Figure 5:
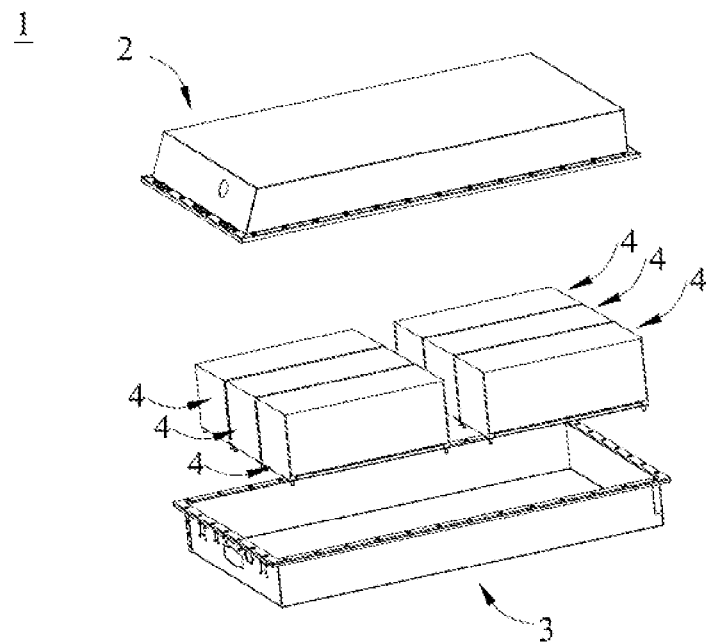
FIG. 5 is an exploded view of FIG. 4.

In some embodiments, with reference to FIG. 4 and FIG. 5, the battery pack 1 may include a battery box and a plurality of battery modules 4 provided in the battery box. The battery case comprises an upper case body 2 and a lower case body 3. The upper case body 2 can cover the lower case body 3 to form a closed space for receiving the battery modules 4. A plurality of battery modules 4 can be disposed in the battery case in any manner.

The fourth aspect of the present application provides an apparatus, the apparatus comprising at least one of the secondary battery, battery module or battery pack according to the present application. The secondary battery may be used as a power source of the apparatus, and may also be used as an energy storage unit of the apparatus. The apparatus may be, but not limited to, a mobile apparatus (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

Figure 6:
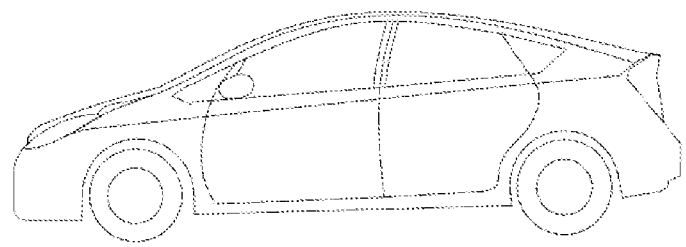
FIG. 6 is a schematic diagram of an embodiment of an apparatus provided by the present application.

For example, FIG. 6 shows an apparatus as an example. The apparatus is a pure electric vehicle, a hybrid electric vehicle, or a plug-in hybrid electric vehicle comprising at least one of the secondary battery, battery module, or battery pack described in this application. The secondary battery, battery module or battery pack according to the present application is used for powering the apparatus.

Some exemplary embodiments of the present application are provided as follows.

Embodiment 1. A secondary battery, comprising a housing as well as an electrode assembly and an electrolyte contained in the housing, the electrode assembly comprising a positive electrode plate, a negative electrode plate and a separator, and the positive electrode plate comprising a positive current collector and a positive electrode film that is disposed on at least one surface of the positive electrode current collector and comprises a positive electrode active material, and the negative electrode plate comprising a negative electrode current collector and a negative electrode film that is disposed on at least one surface of the negative electrode current collector, wherein the positive electrode active material comprises one or more of lithium nickel cobalt manganese oxide and lithium nickel cobalt aluminum oxide;

the negative electrode active material comprises silicon-based material and carbon material;

and the secondary battery satisfies: $0.05 \leq Z \leq 0.6$, wherein $$Z=\{Vt-V0-(H_b-H_a)*S-V1\}/CAP;$$

Vt represents a volume of internal space of the housing, in $cm^3$;

V0 represents a volume of the electrode assembly when the battery is at 0% SOC, in $cm^3$;

$H_a$ represents a thickness of the negative electrode film when the battery is at 0% SOC, in cm;

$H_b$ represents a thickness of the negative electrode film when the battery is at 100% SOC, in cm;

S represents total area of the negative electrode film in the battery, in $cm^2$;

V1 represents the volume of the electrolyte in the battery after formation, in $cm^3$; and CAP represents a rated capacity of the battery, in Ah.

Embodiment 2. The secondary battery according to embodiment 1, wherein: the secondary battery satisfies $0.1 \leq Z \leq 0.5$; optionally $0.15 \leq Z \leq 0.4$.

Embodiment 3. The secondary battery according to embodiment 1 or 2, wherein: the secondary battery satisfies: $1 < H_b/H_a \leq 1.5$; optionally, $1 < H_b/H_a \leq 1.3$.

Embodiment 4. The secondary battery according to any one of embodiments 1 to 3, wherein the secondary battery further satisfies $1.5$ g/Ah$\leq$Mel/CAP$\leq 2.4$ g/Ah, optionally $1.7$ g/Ah$\leq$Mel/CAP$\leq 2.2$ g/Ah, where Mel represents: mass of the electrolyte in the battery after formation, in g.

Embodiment 5. The secondary battery according to any one of embodiments 1 to 4, wherein the electrolyte has a density Del of $1.0$ g/cm$^3 \leq$Del$\leq 1.3$ g/cm$^3$, optionally, $1.1$ g/cm$^3 \leq$Del$\leq 1.25$ g/cm$^3$.

Embodiment 6. The secondary battery according to any one of embodiments 1 to 5, wherein the negative electrode film has a coating weight CW of $5$ mg/cm$^2 \leq$CW$\leq 15$ mg/cm$^2$; optionally, $6$ mg/cm$^2 \leq$CW$\leq 13$ mg/cm$^2$.

Embodiment 7. The secondary battery according to any one of embodiments 1 to 6, wherein the negative electrode film has a compaction density PD of $1.4$ g/cm$^3 \leq$PD$\leq 1.8$ g/cm$^3$, optionally, $1.5$ g/cm$^3 \leq$PD$\leq 1.7$ g/cm$^3$.

Embodiment 8. The secondary battery according to any one of embodiments 1 to 7, wherein the silicon-based material comprises one or more of silicon element, silicon alloy, silicon-oxygen compound, silicon-carbon composite, and silicon-nitrogen compound; optionally, the silicon-based material comprises silicon-oxygen compound.

Embodiment 9. The secondary battery according to any one of embodiments 1 to 8, wherein a mass percentage W of the silicon-based material in the negative electrode active material satisfies: W$\leq 40$%; optionally, $10$%$\leq$W$\leq 30$%.

Embodiment 10. The secondary battery according to any one of embodiments 1 to 9, wherein the carbon material comprises one or more of graphite, soft carbon, and hard carbon; optionally, the carbon material comprises graphite, and the graphite is selected from one or more of artificial graphite and natural graphite.

Embodiment 11. The secondary battery according to any one of embodiments 1 to 10, wherein a wall thickness T of the housing satisfies $0.2$ mm$\leq$T$\leq 1$ mm; optionally, $0.4$ mm$\leq$T$\leq 0.7$ mm.

Embodiment 12. The secondary battery according to any one of embodiments 1 to 11, wherein the secondary battery further comprises a top cover in which a turnover unit is arranged, and the turnover unit has a compressive strength of $\geq 0.35$ MPa.

Embodiment 13. The secondary battery according to any one of embodiments 1 to 12, wherein: the positive electrode active material comprises one or more of a material having a general formula $Li_aNi_bCo_cM_dM'_eO_fA_g$ or a material $Li_aNi_bCo_cM_dM'_eO_fA_g$ coated with a coating layer on at least a part of its surface, wherein $0.8 \leq a \leq 1.2$, $0.5 \leq b < 1$, $0 < c < 1$, $0 < d < 1$, $0 \leq e \leq 0.1$, $1 \leq f \leq 2$, $0 \leq g \leq 1$, M is selected from one or more of Mn and Al, M' is selected from one or more of Zr, Al, Zn, Cu, Cr, Mg, Fe, V, Ti, and B, and A is selected from one or more of N, F, S, and Cl.

Embodiment 14. The secondary battery according to any one of embodiments 1 to 13, wherein at least a part of the positive electrode active material is in form of single crystal particles.

Embodiment 15. The secondary battery according to any one of embodiments 1 to 12, wherein the positive electrode active material further comprises one or more of lithium nickel oxide, lithium manganese oxide, lithium iron phosphate, lithium manganese phosphate, lithium iron manganese phosphate, lithium cobalt oxide and their modified compounds.

Embodiment 16. A battery module comprising the secondary battery according to any one of embodiments 1 to 15.

Embodiment 17. A battery pack comprising the battery module according to embodiment 16.

Embodiment 18. An apparatus comprising at least one of the secondary battery according to embodiment 1-15, the battery module according to embodiment 16, or the battery pack according to embodiment 17.

The following examples further illustrate the beneficial effects of the present application.

Examples

In order to make the object, technical solution, and beneficial technical effects of the present application apparent, the following describes the present application in detail with reference to the examples. However, it should be understood that the examples described in the present description are only for explaining the present application, and are not intended to limit the application; and the embodiments of the application are not limited to the particular embodiments given in the specification. The embodiments in which the particular experimental conditions or operating conditions are not specified are preformed under conventional conditions, or under the conditions recommended by the material supplier.

I. Preparation of Battery to be Tested

The batteries of Example and Comparative Examples were prepared and tested according to the following methods.

Example 1

A battery has a rated capacity of 70 Ah.

(1) Preparation of Positive Electrode Plate

NCM811 ($LiNi_{0.8}Co_{0.1}Mn_{0.1}O_2$) as a positive electrode active material, acetylene black as a conductive agent and PVDF as a binder were mixed in a mass ratio of 96:2:2, and added into NMP as a solvent, to obtain a system; the system was stirred in a vacuum mixer until the system was uniform, to give a positive electrode slurry; the positive electrode slurry was evenly coated on an aluminum foil as a positive electrode current collector; the positive electrode slurry on the positive electrode current collector was dried at room temperature and transferred to an oven for further drying, and then cold-pressed, slit, and cut, to obtain a positive electrode plate.

(2) Preparation of Negative Electrode Plate

Negative electrode active material, acetylene black as a conductive agent, and sodium polyacrylate as a binder were mixed according to a given mass ratio (see Table 1 for details), and added into deionized water as a solvent, to obtain a system; the system was stirred in a vacuum mixer until the system was uniform, to give a negative electrode slurry; the negative electrode slurry was evenly coated on a copper foil as a negative electrode current collector, and then cold-pressed, slit, and cut, to obtain a negative electrode plate.

(3) Preparation of Electrolyte

Ethylene carbonate (EC), ethyl methyl carbonate (EMC), and diethyl carbonate (DEC) were mixed in a volume ratio of EC:EMC:DEC=1:1:1 to obtain an organic solvent. A fully dried $LiPF_6$ as lithium salt was dissolved in the organic solvent followed by adding fluoroethylene carbonate (FEC). After mixing uniformly, an electrolyte was obtained, in which the concentration of $LiPF_6$ was 1 mol/L and the mass percentage of FEC in the electrolyte was 6%.

(4) Separator

Polyethylene film was used as a separator.

(5) Preparation of Lithium-Ion Battery

The positive electrode plate, the separator, and the negative electrode plate were laminated in order, so that the separator was placed between the positive and negative electrode plates to provide isolation; after winding step, an electrode assembly was obtained; the electrode assembly was placed in the outer packaging housing which was then covered with a top cover, dried and injected with an electrolyte. After vacuum packaging, standing, formation, shaping and other processes, a lithium-ion battery was obtained. Inner volume of the outer packaging housing was 364 $cm^3$.

In Examples 2-28 (Ex. 2-28) and Comparative Examples 1-12 (CE. 1-12), the preparation processes similar to those of Example 1 were used, with the differences that Z values varied by adjusting the relevant process parameters.

II. Tests of Parameters and Performance of Battery

1. Test Methods for Parameters:

(1) The internal volume Vt of the housing:

When the housing was square (cuboid or cube): a ruler was used to measure length A, width B, and height C inside the housing, and Vt=A*B*C;

When the housing was cylindrical: a ruler and a vernier caliper were used to measure the inner diameter A and height h of the housing, and Vt=h*π*(0.5*A)².

(2) When the battery was at 0% SOC, the volume V0 of electrode assembly: After the battery of each of Examples and Comparative Examples was discharged to 0% SOC at a rate of 1C, the volume $V_0$ of the electrode assembly was measured by the drainage method.

(3) Density Del of electrolyte: a certain volume V ($cm^3$) of electrolyte was taken and its mass m(g) was weighed with an electronic balance, then Del=m/V.

(4) When the battery was at 0% SOC, the thickness Ha of the negative electrode film: After the battery of each of Examples and Comparative examples was discharged to 0% SOC at a rate of 1C, the thickness Ha (single side) of the negative electrode film was measured with a micrometer.

(5) When the battery was at 100% SOC, the thickness Hb of the negative electrode film: After the battery of each of Examples and Comparative examples was charged to 100% SOC at a rate of 1C, the thickness Hb (single side) of the negative electrode film was measured with a micrometer.

(6) The total area of the negative electrode film:

Wound-Type Electrode Assembly

1) Single-sided coating: S=total length of negative electrode film*width of negative electrode film*number of electrode assembly in the housing;

2) Double-sided coating: S=2*total length of negative electrode film (single side)*width of negative electrode film (single side)*number of electrode assembly in the housing;

Staked (Laminated)-Type Electrode Assembly

1) Single-sided coating: S=length of negative electrode film in a single negative electrode plate*width of negative electrode film in a single negative electrode film*number of negative electrode plate;

2) Double-sided coating: S=2*length of negative electrode film in a single negative electrode plate (single side) *width of negative electrode film in a single negative electrode plate (single side)*the number of negative electrode plate.

2. Test methods for parameters:

(1) Gas production in high-temperature storage: a gas production device was mounted on lithium-ion batteries prepared in the examples and comparative examples; and the capacity was measured at 1C/1C full charge and full discharge; after the battery was full charged at 1C and stored at 70° C. for 72 hours, the internal pressure value was taken.

(2) Test for kinetic performance: At 25° C., the lithium-ion batteries prepared in Examples and Comparative examples were fully charged at 3C and fully discharged at 1C for 10 times; then the batteries were fully charged at 3C, and then the negative electrode plate was disassembled from the batteries for the observation of flatness and lithium precipitation on the surface of the electrode plate. An area of lithium precipitation area on surface of the negative electrode of less than 5% was considered to represent a slight lithium precipitation, an area of lithium precipitation area on surface of the negative electrode of from 5% to 40% was considered to represent moderate lithium precipitation, and an area of lithium precipitation area on surface of the negative electrode of greater than 40% was considered to represent serious lithium precipitation.

(3) Test for cycle performance: At 45° C., the lithium-ion batteries prepared in the examples and comparative examples were charged at a rate of 1C and discharged at a rate of 1C, and subjected to a full-charge and full-discharge cycle test, until the capacity of the lithium-ion batteries decayed to 80% of the initial capacity. The number of cycles was reported.

III. Test Results of Examples and Comparative Examples

The composition data of and results in tests for performance of batteries of Example and Comparative Examples were summarized in Table 1 to Table 2 below.

From Examples 1 to 28, it was concluded that when a battery had $Z=\{V_t-V_0-(H_b-H_a)*S-V_1\}/CAP$ satisfying $0.05 \leq Z \leq 0.6$, the battery may have a relatively good cycle performance (not less than 480 cycles) and kinetic performance (no lithium precipitation or only slight lithium precipitation). In particular, when $0.1 \leq Z \leq 0.5$, the batteries exhibited even better cycle performance (not less than 600 cycles) and kinetic performance (no lithium precipitation).

Comparative Examples 1 to 12 showed that: if the Z value was too small, the batteries had very bad cycle performance and a large internal pressure; and if the Z value was too large, serious lithium precipitation was caused.

Therefore, only when the Z value of a battery was controlled within the range specified in this application, can both better cycle performance and kinetic performance be achieved, while ensuring the safety during use of the battery.

Based on the disclosure and teaching of the foregoing specification, those skilled in the art to which this application belongs can also make appropriate changes and modifications to the foregoing embodiments. Therefore, the present application is not limited to the specific embodiments disclosed and described above, and some modifications and changes to the present application also fall within the protection scope of the claims of the present application. In particular, as long as there is no conflict, various technical features mentioned in the various embodiments can be combined in any manner.

TABLE 1

Different formulations in negative electrode with various different silicon amounts

| W (mass percentage of the silicon-based material in the negative electrode active material) | Percentage of negative electrode active material in negative electrode film | Percentage of acetylene black as conductive agent | Percentage of sodium polyacrylate as binder |
|---|---|---|---|
| 0% < W ≤ 10% | 97.2% | 0.8% | 2% |
| 10% < W ≤ 20% | 95.5% | 1.5% | 3% |
| 20% < W ≤ 30% | 94.0% | 2.0% | 4% |
| 30% < W ≤ 40% | 92.5% | 2.5% | 5% |

TABLE 2

Test results of parameters and performance in Examples 1 to 28 and Comparative Examples 1 to 12

| No. | W | CAP (Ah) | Vt (cm³) | V0 (cm³) | V1 (cm³) | Ha (cm) | Hb (cm) | S (cm²) | Z | Mel/CAP | Internal pressure value after storage at 70° C. for 72 h | Number of cycles at 45° C. | Kinetic performance |
|---|---|---|---|---|---|---|---|---|---|---|---|---|---|
| Ex. 1 | 5% | 70 | 370 | 240 | 118 | 0.0084 | 0.0088 | 9635 | 0.050 | 2.02 | 0.341 | 480 | No lithium precipitation |
| Ex. 2 | 5% | 70 | 370 | 241 | 111 | 0.0079 | 0.0083 | 9922 | 0.146 | 1.90 | 0.312 | 800 | No lithium precipitation |
| Ex. 3 | 5% | 70 | 370 | 243 | 99 | 0.0074 | 0.0078 | 10332 | 0.282 | 1.70 | 0.151 | 1100 | No lithium precipitation |
| Ex. 4 | 5% | 70 | 370 | 238 | 93 | 0.0086 | 0.0091 | 9102 | 0.435 | 1.60 | 0.117 | 1100 | No lithium precipitation |
| Ex. 5 | 5% | 70 | 370 | 233 | 88 | 0.0096 | 0.0101 | 8413 | 0.600 | 1.50 | 0.080 | 900 | Slight lithium precipitation |
| Ex. 6 | 10% | 70 | 370 | 248 | 105 | 0.0056 | 0.0061 | 11644 | 0.077 | 1.80 | 0.322 | 560 | No lithium precipitation |
| Ex. 7 | 10% | 70 | 370 | 225 | 117 | 0.0072 | 0.0078 | 10234 | 0.217 | 2.00 | 0.201 | 1050 | No lithium precipitation |
| Ex. 8 | 10% | 70 | 370 | 231 | 105 | 0.0061 | 0.0067 | 11070 | 0.312 | 1.80 | 0.136 | 1050 | No lithium precipitation |
| Ex. 9 | 10% | 70 | 370 | 219 | 96 | 0.0084 | 0.0091 | 9627 | 0.576 | 1.65 | 0.082 | 950 | Slight lithium precipitation |
| Ex. 10 | 15% | 70 | 370 | 230 | 123 | 0.0044 | 0.0048 | 12940 | 0.084 | 2.10 | 0.304 | 700 | No lithium precipitation |
| Ex. 11 | 15% | 70 | 370 | 230 | 105 | 0.0044 | 0.0048 | 12940 | 0.334 | 1.80 | 0.122 | 1000 | No lithium precipitation |
| Ex. 12 | 15% | 70 | 370 | 223 | 99 | 0.0061 | 0.0067 | 10250 | 0.509 | 1.70 | 0.094 | 940 | Slight lithium precipitation |
| Ex. 13 | 20% | 90 | 480 | 307 | 146 | 0.0050 | 0.0056 | 15394 | 0.092 | 1.95 | 0.298 | 720 | No lithium precipitation |
| Ex. 14 | 20% | 90 | 480 | 312 | 128 | 0.0044 | 0.0049 | 15549 | 0.260 | 1.70 | 0.160 | 950 | No lithium precipitation |
| Ex. 15 | 20% | 70 | 370 | 232 | 102 | 0.0046 | 0.0052 | 10611 | 0.346 | 1.75 | 0.117 | 950 | No lithium precipitation |
| Ex. 16 | 20% | 70 | 370 | 224 | 93 | 0.0054 | 0.0060 | 10480 | 0.558 | 1.60 | 0.094 | 820 | Slight lithium precipitation |

TABLE 2-continued

Test results of parameters and performance in Examples 1 to 28 and Comparative Examples 1 to 12

| No. | W | CAP (Ah) | Vt (cm$^3$) | V0 (cm$^3$) | V1 (cm$^3$) | Ha (cm) | Hb (cm) | S (cm$^2$) | Z | Mel/CAP | Internal pressure value after storage at 70° C. for 72 h | Number of cycles at 45° C. | Kinetic performance |
|---|---|---|---|---|---|---|---|---|---|---|---|---|---|
| Ex. 17 | 25% | 90 | 480 | 312 | 143 | 0.0039 | 0.0044 | 17695 | 0.087 | 1.90 | 0.301 | 710 | No lithium precipitation |
| Ex. 18 | 25% | 90 | 480 | 296 | 135 | 0.0054 | 0.0060 | 13812 | 0.345 | 1.80 | 0.118 | 900 | No lithium precipitation |
| Ex. 19 | 25% | 70 | 370 | 224 | 93 | 0.0060 | 0.0068 | 8758 | 0.565 | 1.60 | 0.088 | 830 | Slight lithium precipitation |
| Ex. 20 | 30% | 70 | 370 | 226 | 123 | 0.0043 | 0.0049 | 12546 | 0.092 | 2.10 | 0.294 | 720 | No lithium precipitation |
| Ex. 21 | 30% | 90 | 480 | 280 | 158 | 0.0052 | 0.0058 | 14654 | 0.261 | 2.10 | 0.158 | 850 | No lithium precipitation |
| Ex. 22 | 30% | 70 | 370 | 204 | 111 | 0.0056 | 0.0064 | 10152 | 0.571 | 1.90 | 0.084 | 750 | Slight lithium precipitation |
| Ex. 23 | 35% | 70 | 370 | 223 | 125 | 0.0041 | 0.0047 | 12530 | 0.094 | 2.15 | 0.029 | 700 | No lithium precipitation |
| Ex. 24 | 35% | 70 | 370 | 212 | 117 | 0.0052 | 0.0060 | 11447 | 0.345 | 2.00 | 0.119 | 800 | No lithium precipitation |
| Ex. 25 | 35% | 90 | 480 | 270 | 143 | 0.0047 | 0.0053 | 14964 | 0.517 | 1.90 | 0.096 | 760 | Slight lithium precipitation |
| Ex. 26 | 40% | 90 | 480 | 288 | 165 | 0.0036 | 0.0042 | 14603 | 0.123 | 2.20 | 0.320 | 610 | No lithium precipitation |
| Ex. 27 | 40% | 70 | 370 | 211 | 123 | 0.0048 | 0.0055 | 11086 | 0.300 | 2.10 | 0.145 | 750 | No lithium precipitation |
| Ex. 28 | 40% | 70 | 370 | 202 | 111 | 0.0056 | 0.0064 | 9676 | 0.596 | 1.90 | 0.076 | 700 | Slight lithium precipitation |
| CE 1 | 5% | 70 | 370 | 250 | 111 | 0.0065 | 0.0069 | 12218 | 0.009 | 1.90 | 0.389 | 350 | No lithium precipitation |
| CE 2 | 5% | 70 | 370 | 233 | 82 | 0.0096 | 0.0101 | 8413 | 0.684 | 1.40 | 0.068 | 650 | Severe lithium precipitation |
| CE 3 | 10% | 90 | 480 | 322 | 143 | 0.0065 | 0.0069 | 16770 | 0.042 | 1.90 | 0.349 | 468 | No lithium precipitation |
| CE 4 | 10% | 70 | 370 | 215 | 88 | 0.0091 | 0.0099 | 8364 | 0.773 | 1.50 | 0.060 | 567 | Severe lithium precipitation |
| CE 5 | 15% | 90 | 480 | 348 | 113 | 0.0074 | 0.0082 | 10526 | 0.041 | 1.50 | 0.357 | 450 | No lithium precipitation |
| CE 6 | 15% | 70 | 370 | 226 | 88 | 0.0050 | 0.0055 | 10135 | 0.662 | 1.50 | 0.070 | 590 | Severe lithium precipitation |
| CE 7 | 20% | 90 | 480 | 307 | 154 | 0.0050 | 0.0056 | 15394 | 0.009 | 2.05 | 0.387 | 340 | No lithium precipitation |
| CE 8 | 20% | 70 | 370 | 212 | 99 | 0.0071 | 0.0079 | 7823 | 0.662 | 1.70 | 0.070 | 624 | Severe lithium precipitation |
| CE 9 | 30% | 70 | 370 | 226 | 128 | 0.0043 | 0.0049 | 12546 | 0.009 | 2.20 | 0.386 | 348 | No lithium precipitation |
| CE 10 | 30% | 90 | 480 | 255 | 143 | 0.0062 | 0.0070 | 12444 | 0.700 | 1.90 | 0.063 | 600 | Severe lithium precipitation |
| CE 11 | 40% | 70 | 370 | 208 | 146 | 0.0052 | 0.0058 | 10627 | 0.044 | 2.50 | 0.351 | 450 | No lithium precipitation |
| CE 12 | 40% | 90 | 480 | 257 | 143 | 0.0057 | 0.0064 | 12436 | 0.699 | 1.90 | 0.064 | 500 | Severe lithium precipitation |

What is claimed is:

1. A secondary battery, comprising a housing as well as an electrode assembly and an electrolyte contained in the housing, the electrode assembly comprising a positive electrode plate, a negative electrode plate and a separator, and the positive electrode plate comprising a positive current collector and a positive electrode film that is disposed on at least one surface of the positive electrode current collector and comprises a positive electrode active material, and the negative electrode plate comprising a negative electrode current collector and a negative electrode film that is disposed on at least one surface of the negative electrode current collector, wherein the positive electrode active material comprises one or more of lithium nickel cobalt manganese oxide and lithium nickel cobalt aluminum oxide;

the negative electrode active material comprises silicon-based material and carbon material;

and the secondary battery satisfies: $0.1 \leq Z \leq 0.6$, wherein $Z = \{Vt - V0 - (H_b - H_a)*S - V1\}/CAP$;

Vt represents a volume of internal space of the housing, in cm$^3$;

V0 represents a volume of the electrode assembly when the battery is at 0% SOC, in cm$^3$;

$H_a$ represents a thickness of the negative electrode film when the battery is at 0% SOC, in cm;

$H_b$ represents a thickness of the negative electrode film when the battery is at 100% SOC, in cm;

S represents total area of the negative electrode film in the battery, in cm$^2$;

V1 represents the volume of the electrolyte in the battery after formation, in cm$^3$; and CAP represents a rated capacity of the battery, in Ah.

2. The secondary battery according to claim 1, wherein: the secondary battery satisfies $0.1 \leq Z \leq 0.5$; optionally $0.15 \leq Z \leq 0.4$.

3. The secondary battery according to claim 1, wherein: the secondary battery satisfies: $1 < H_b/H_a \leq 1.5$; optionally, $1 < H_b/H_a \leq 1.3$.

4. The secondary battery according to claim 1, wherein the secondary battery further satisfies 1.5 g/Ah≤Mel/CAP≤2.4 g/Ah, optionally 1.7 g/Ah≤Mel/CAP≤2.2 g/Ah, where Mel represents: mass of the electrolyte in the battery after formation, in g.

5. The secondary battery according to claim 1, wherein the electrolyte has a density Del of 1.0 g/cm³≤Del≤1.3 g/cm³, optionally, 1.1 g/cm³≤Del≤1.25 g/cm³.

6. The secondary battery according to claim 1, wherein the negative electrode film has a coating weight CW of 5 mg/cm²≤CW≤15 mg/cm²; optionally, 6 mg/cm²≤CW≤13 mg/cm².

7. The secondary battery according to claim 1, wherein the negative electrode film has a compaction density PD of 1.4 g/cm³≤PD≤1.8 g/cm³, optionally, 1.5 g/cm³≤PD≤1.7 g/cm³.

8. The secondary battery according to claim 1, wherein the silicon-based material comprises one or more of silicon element, silicon alloy, silicon-oxygen compound, silicon-carbon composite, and silicon-nitrogen compound; optionally, the silicon-based material comprises silicon-oxygen compound.

9. The secondary battery according to claim 1, wherein a mass percentage W of the silicon-based material in the negative electrode active material satisfies: W≤40%; optionally, 10%≤W≤30%.

10. The secondary battery according to claim 1, wherein the carbon material comprises one or more of graphite, soft carbon, and hard carbon; optionally, the carbon material comprises graphite, and the graphite is selected from one or more of artificial graphite and natural graphite.

11. The secondary battery according to claim 1, wherein a wall thickness T of the housing satisfies 0.2 mm≤T≤1 mm; optionally, 0.4 mm≤T≤0.7 mm.

12. The secondary battery according to claim 1, wherein the secondary battery further comprises a top cover in which a turnover unit is arranged, and the turnover unit has a compressive strength of ≥0.35 MPa.

13. The secondary battery according to claim 1, wherein: the positive electrode active material comprises one or more of a material having a general formula $Li_aNi_bCo_cM_dM'_eO_fA_g$ or a material $Li_aNi_bCo_cM_dM'_eO_fA_g$ coated with a coating layer on at least a part of its surface, wherein $0.8 \leq a \leq 1.2$, $0.5 \leq b < 1$, $0 < c < 1$, $0 < d < 1$, $0 \leq e \leq 0.1$, $1 \leq f \leq 2$, $0 \leq g \leq 1$, M is selected from one or more of Mn and Al, M' is selected from one or more of Zr, Al, Zn, Cu, Cr, Mg, Fe, V, Ti, and B, and A is selected from one or more of N, F, S, and Cl.

14. The secondary battery according to claim 1, wherein at least a part of the positive electrode active material is in form of single crystal particles.

15. The secondary battery according to claim 1, wherein the positive electrode active material further comprises one or more of lithium nickel oxide, lithium manganese oxide, lithium iron phosphate, lithium manganese phosphate, lithium iron manganese phosphate, lithium cobalt oxide and their modified compounds.

16. A battery module comprising the secondary battery according to claim 1.

17. A battery pack comprising the battery module according to claim 16.

18. An apparatus comprising at least one of the secondary battery according to claim 1.

* * * * *